Jan. 27, 1970  R. J. CURRAN ET AL  3,491,966
SAFETY BELT RETRACTOR
Filed May 27, 1968  4 Sheets-Sheet 1
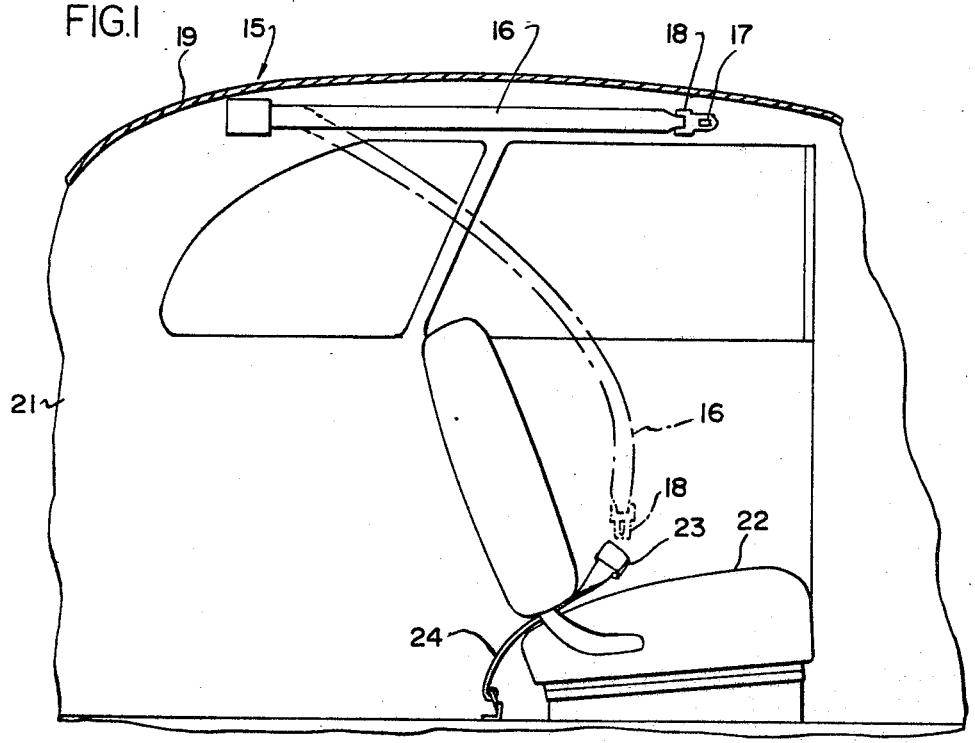
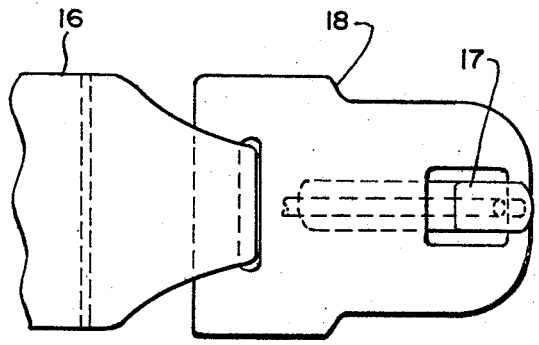
INVENTORS
ROBERT J. CURRAN
STEPHEN J. ZANONI
BY  Herman E. Smith
ATTORNEY Jan. 27, 1970   R. J. CURRAN ET AL   3,491,966
SAFETY BELT RETRACTOR
Filed May 27, 1968   4 Sheets-Sheet 2

INVENTORS
ROBERT J. CURRAN
STEPHEN J. ZANONI

BY Herman E. Smith

ATTORNEY.

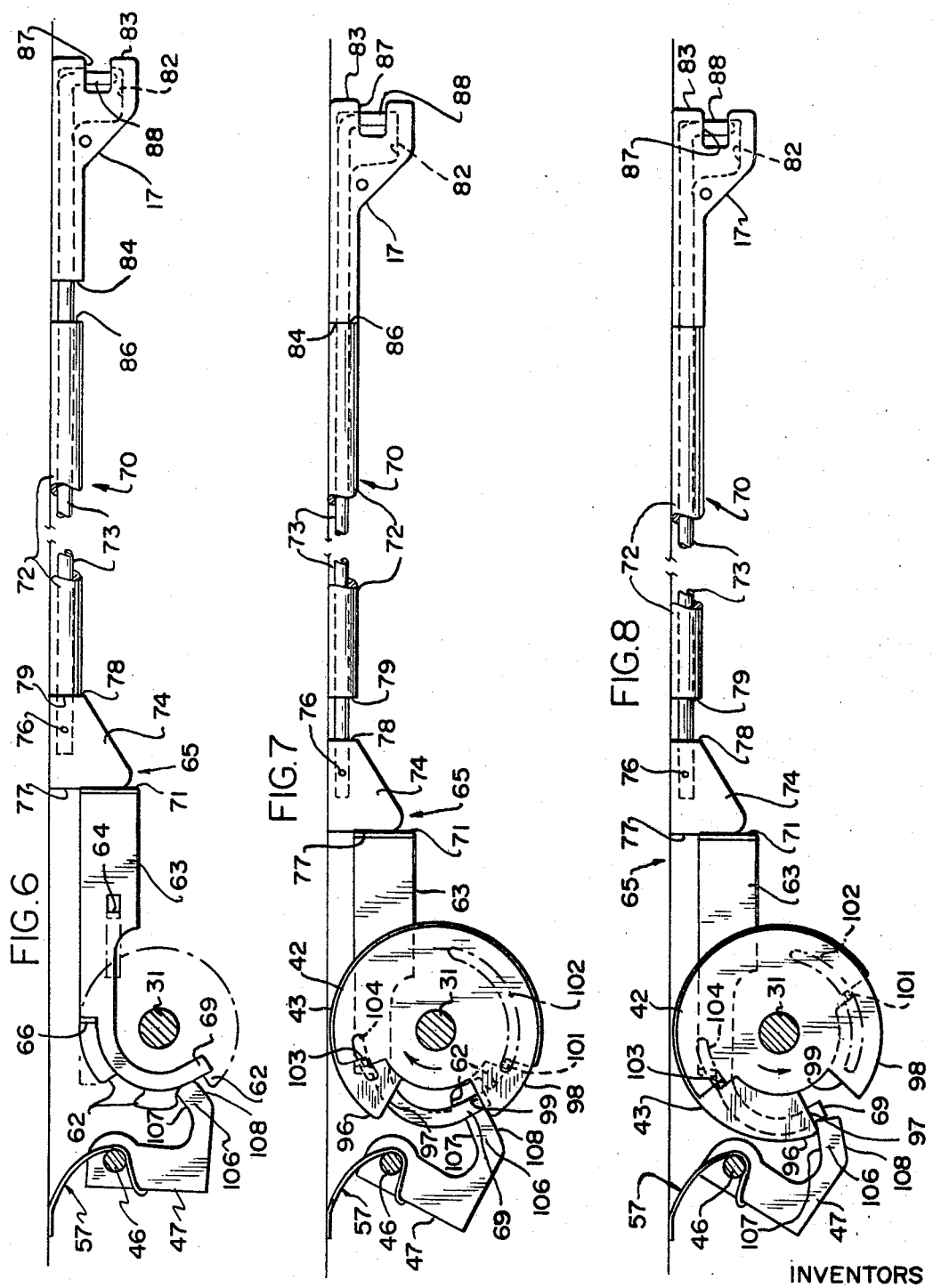

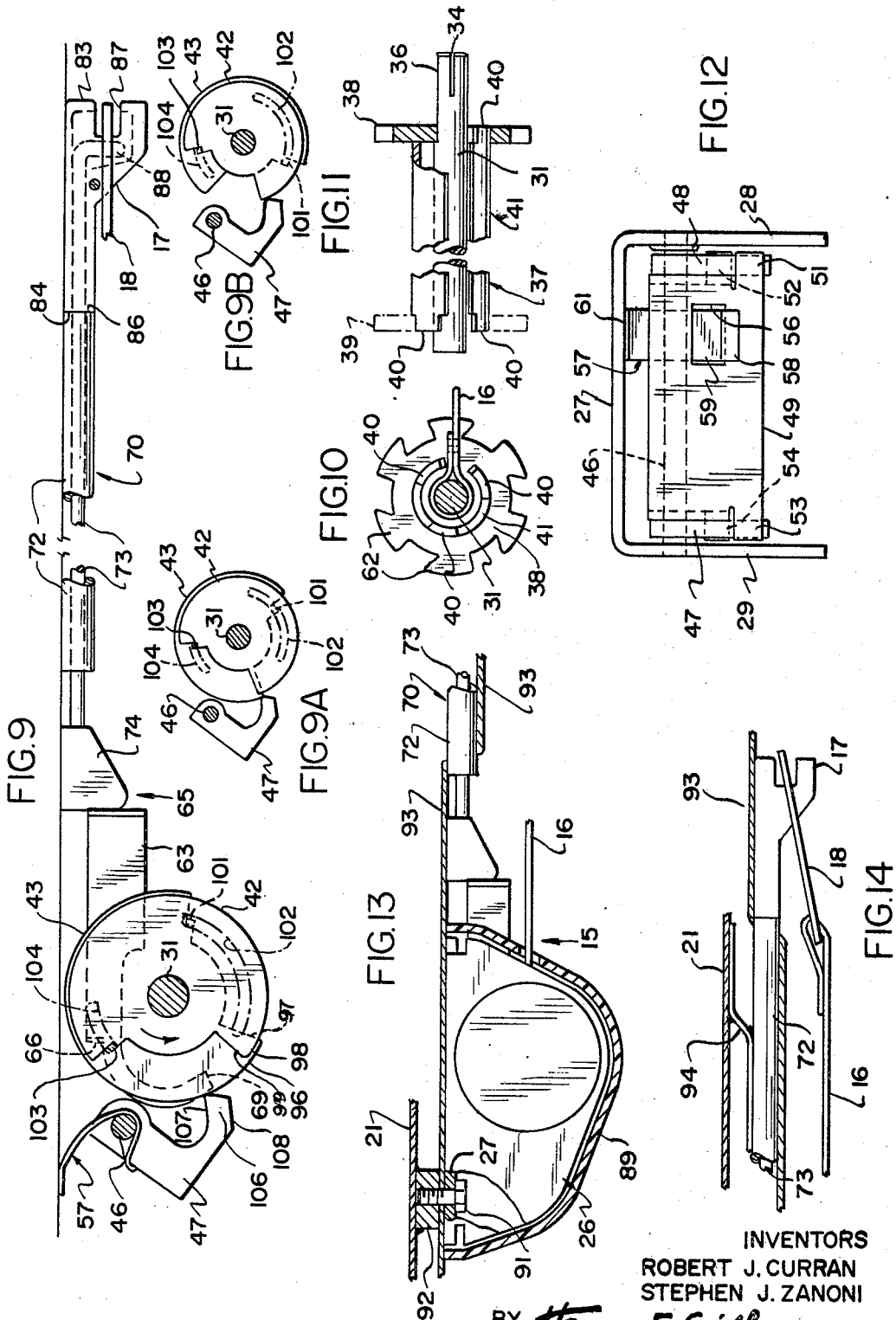

United States Patent Office 3,491,966
Patented Jan. 27, 1970

3,491,966
SAFETY BELT RETRACTOR
Robert J. Curran, Elmhurst, and Stephen J. Zanoni, Glen Ellyn, Ill., assignors to Borg-Warner Corporation, Chicago, Ill., a corporation of Delaware
Filed May 27, 1968, Ser. No. 732,450
Int. Cl. B65h 75/48; B60r 21/10
U.S. Cl. 242—107.4                        13 Claims

ABSTRACT OF THE DISCLOSURE

A safety belt retractor includes a pawl and a belt spool having ratchet teeth which cooperate to prevent spool rotation in either direction, thus providing body restraint while avoiding continuous belt pressure on an occupant. The pawl is provided with one disengaged position permitting adjustment of the belt length, and a second disengaged position which permits full retraction and extension of the belt. A latch is included which maintains the pawl in its second disengaged position until the spool is again rotated in the retraction direction. The retractor is adapted for mounting in a motor vehicle above and behind a seat and includes a remote pawl operator located near the seat. The pawl operator has an exposed push button for moving the pawl to the adjusting position, and a recessed push button operable by insertion of a belt fastener for moving the pawl to the second disengaged position permitting full retraction and extension of the belt.

SUMMARY OF THE INVENTION

The present invention relates generally to belt retractors and more particularly to a locking retractor. The increased application of safety belts in motor vehicles, particularly the addition of so called shoulder straps or harness, has increased the need for improved facilities for storing the belt when not in use. It is believed evident, without extended discussion, that loose lap belts and shoulder harness can impede a passenger's entrance to or exit from a vehicle, and that damage to the belt clasp can occur if the belt should interfere with the closing of the vehicle door.

An object of the present invention, is to overcome the above named difficulties by providing improved apparatus for storing the safety belt when not in use. Among other objects of the invention are to provide apparatus for overhead storage of unused safety belt; to provide belt retractor apparatus which avoids applying belt tension to the body of an occupant; to provide belt retractor apparatus having locking, adjusting, and free rotation modes of operation; to provide a compound manual control for a releasable belt retractor; and to provide a retractor control permitting adjustment of the belt length when operated by the hand of an occupant and permitting full retraction and extension of the belt when operated by means of a belt fastener. Other objects and advantages of the invention will become apparent from consideration of the following description together with the drawings.

BRIEF DESCRIPTION OF THE DRAWINGS

FIGURE 1 is an environmental view, schematically showing the retractor apparatus of the present invention in relation to a seat and roof line of a motor vehicle;

FIGURE 2 is a plan view of a portion of the retractor apparatus of FIGURE 1 showing a belt clasp engaged with a retractor control;

FIGURES 6 through 9b are elevation views, with portions broken away, to reveal the cooperation of certain retractor components throughout a sequence of operations;

FIGURE 10 is a fragmentary elevation view of a portion of the retractor spool;

FIGURE 11 is a fragmentary end view of a portion of the retractor spool;

FIGURE 12 is an end view of the retractor frame showing a pawl assembly mounted thereon; and FIGURES 13 and 14 are fragmentary elevation views illustrating the mounting of the retractor apparatus of the present invention.

DESCRIPTION OF THE PREFERRED EMBODIMENTS

Figure 3:
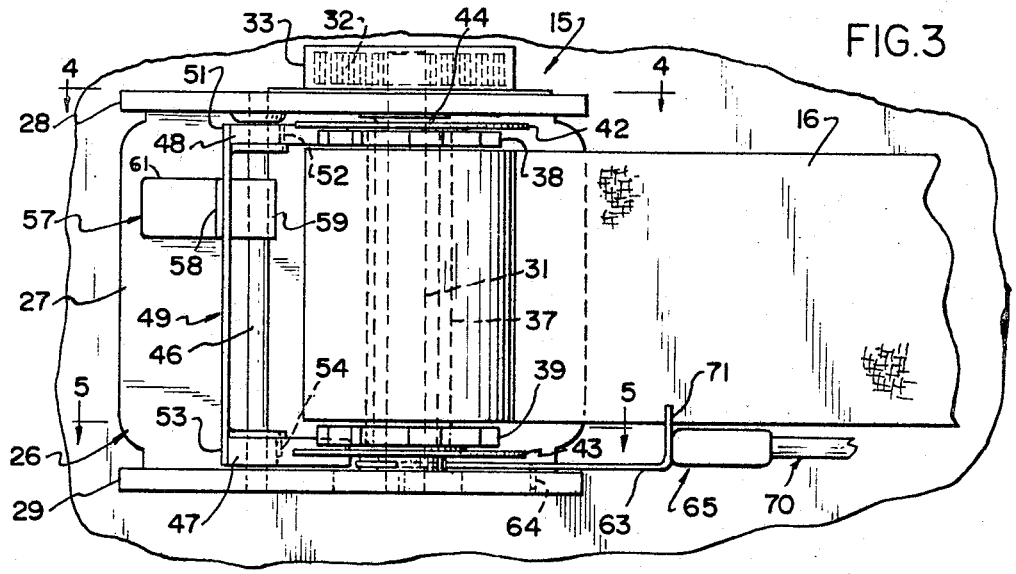
FIGURE 3 is a plan view of another portion of the retractor mechanism shown in FIGURE 1.

Referring now in greater detail to the drawings, and more particularly FIGURES 1 through 3 thereof, an improved belt retractor assembly 15 is shown, having a safety belt 16 extending therefrom, and including a remote operator member 17 particularly adapted for cooperation with a portion of a belt clasp 18. Retractor 15 is shown mounted on a roof portion 19 of a motor vehicle body 21 above a window thereof and behind a seat 22. Belt 16 is stored above the window when not in use, and can be pulled down as shown in phantom lines in FIGURE 1, for connection to a buckle 23 of a second anchored belt portion 24. Remote operator member 17 also serves as a support or hook, assisting in storing the belt 16 above the window line of the vehicle, out of the way of passengers entering or leaving the vehicle.

Figure 4:
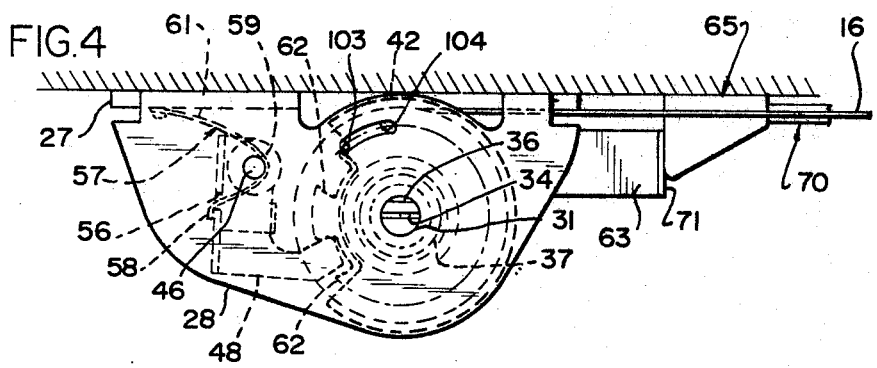
FIGURE 4 is a section view taken along line 4—4 of FIGURE 3.
Figure 5:
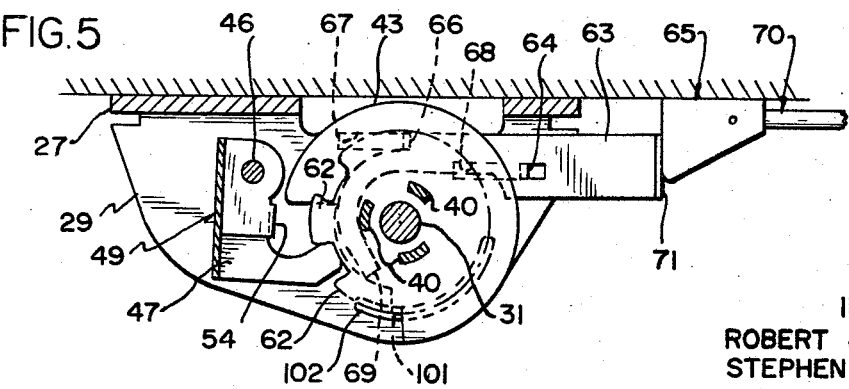
FIGURE 5 is a section view taken along the line 5—5 of FIGURE 3.

Referring now to FIGURES 3, 4, and 5, the winding portion of retractor assembly 15 will be described in greater detail. Frame 26 includes a base portion 27 and a pair of side-walls 28, 29. An arbor 31 is journaled for rotation in side-walls 28, 29 and extends beyond side-wall 28 into driving connection with a spring 32 of spring motor 33. The extended portion of arbor 31 includes a slot 34 for connection to spring 32. A flat 36 on arbor 31 provides a drive connection for a belt spool 37. Belt spool 37 includes a barrel portion 41 having a series of projections 40 extending into a pair of ratchet wheels 38, 39 supported on arbor 31. As shown in more detail in FIGURES 10, and 11, belt 16 extends through a slot in barrel 41 and is looped about arbor 31 thereby providing means for winding the belt onto spool 37 upon rotation thereof.

A pair of latches 42, 43 are coaxially supported on arbor 31 and are held in frictional engagement with respective end surfaces of spool 37 by means of a wave-washer 44. Latch discs 42 and 43 are generally similar in construction, disc 43 being slightly larger than disc 42. Disc 43 includes a radially extended pawl obstructing portion 96 defining a stop shoulder 97, and disc 42 includes a radially extended pawl obstructing portion 98 defining a stop shoulder 99. Disc 43 is pivotally mounted on arbor 31, coaxially with spool 37, and includes a projection 101 extending into the longer curved slot 102 in sidewall 29. The arcuate extent and disposition of curved slot 102 limits the pivotal movement of obstructing portion 96 with respect to pawl 47. Disc 42 is also pivotally mounted on arbor 31, coaxially with spool 37, and includes a similar projection 103 extending into the shorter curved slot 104 in sidewall 28. The arcuate extent and disposition of curved slot 104 limits the pivotal movement of obstructing portion 98 with respect to pawl 48. Although the latches 42 and 43 are shown in the form of discs, other shapes such as for example, pivotally mounted arms having a pawl obstructing portion and stop shoulder, may be employed if desired.

A pin 46 also extends between sidewalls 28, 29 and serves to pivotally support a pair of pawls 47, 48. A pawl carrier 49 is supported on pin 46 and includes tab portions 51, 52, 53, 54 embracing pawls 47, 48. Pawl carrier 49 includes an aperture 56 through which extends a spring 57. As shown particularly in FIGURES 3, 4, and 12, spring 57 includes a hook portion 58 engaged with aperture 56, a bight portion 59 extending around pin 46, and a leg portion 61 bearing against base portion 27 of frame 26. As shown particularly in FIGURES 3 and 4, pawls 47 and 48 are constantly urged into locking engagement with ratchet teeth 62 of ratchet wheels 38 and 39 by means of spring 57 acting between base portion 27 and pawl carrier 49. When pawls 47 and 48 are engaged with ratchet wheels 38 and 39, belt spool 37 is prevented from rotation in either direction. When pawls 47 and 48 are disengaged from ratchet wheels 38, 39, spring motor 33 urges rotation of spool 37 in a direction to retract belt 16 into a roll wound around barrel portion 41. When the pawls are disengaged from the ratchet wheels, spool 37 can be forcibly rotated against the bias of spring motor number 33, by pulling belt 16 outwardly in an extracting direction.

A pawl operator 65 includes a slide bar 63 and an extension member 70. Slide bar 63 is slidably mounted on frame 26, having a pair of tabs 64, 66 extending into guide slots 67, 68 in side-wall 29. One end of slide bar 63 includes a pawl engaging portion 69 while the other end thereof includes an arm 71 engageable with extension member 70.

As shown in greater detail in FIGURES 6 through 9, extension member 70 includes a tubular member 72 secured to retractor frame 26 or to a portion of the vehicle frame. A wire-like push rod member 73 is arranged to slide longitudinally within tubular member 72. Both tubular member 72 and push rod member 73 may be constructed of flexible material if desired in order to accommodate mounting on a curved frame member. Flexible construction of these members also provides greater latitude in selecting a desirable location for the retractor operator. A knob 74 is secured to push rod 73 by a set screw 76, for movement therewith. One end surface 77 of knob 74 is arranged to abut arm 71 of slide bar 63 while the other end surface 78 of knob 74 is arranged to abut end surface 79 of tubular member 72. The hollow push button 17 slidably encloses the other end of push rod 73 in an oversize cavity 82, forming a lost motion connection therebetween. Push button 17 is provided with an exposed end surface 83 adapted to be engaged by the hand of a vehicle occupant for operating extension member 70. Stop surfaces 84 and 86 are provided for limiting the extent of sliding movement of push button 17. Push button 17 is also provided with an aperture 87 providing access to push rod 73. As indicated in FIGURE 9, belt clasp portion 18 may be inserted in aperture 87 for engagement with L-shaped portion 88 of push rod 73. Insertion of clasp 18 provides further movement of push rod 73 after push button 17 has been moved against end surface 86 of tubular member 72. Push rod 73 and push button 17 thus provide a compound pawl operator member having two modes of actuation. One mode of actuation is by manual movement of push button 17, and results in movement of the pawls to a first disengaged position as shown in FIGURES 7 and 8. The other mode of actuation is by insertion of belt clasp portion 18, and results in further movement of the pawls to a second disengaged position as shown in FIGURE 9.

Referring now to FIGURES 13 and 14, a plastic housing 89 encloses the winding portion of retractor 15. A cap screw 91 extends through base portion 27 of frame 26 into engagement with a threaded fitting 92 secured to a portion of vehicle body 21. If desired, extension member 70 may have portions thereof located beneath the vehicle upholstery 93. Tubular member 72 may be secured to a portion of vehicle body 21 by means of a bracket 94 while its respective end portions extend through apertures in upholstery 93. Push button 17 can thus be located in a position for convenient operation by a vehicle occupant while the winding portion of the retractor can be placed in a more remote location.

OPERATION

The operation of retractor 15 can be more readily comprehended by reference to FIGURES 6 through 9b. As shown in FIGURE 6, the pawls include a tang portion 106 having stop surfaces 107, 108, engaged between a pair of adjacent ratchet teeth 62. Both pawls are constantly urged toward engagement with both ratchet wheels by means of spring 57. When so engaged, spool 37 is locked against rotation in either direction. When the spool is locked, belt 16 is prevented from unwinding and thus provides restraint for the body of a vehicle occupant during vehicle deceleration. Locking of the spool also prevents spring motor 33 from exerting tension on belt 16 and thus relieves belt pressure from the body of the occupant. In the locked position of FIGURE 6, pawl 47 bears against slide bar 63 urging push rod 73 to its inactive position. Push button 17 is loosely connected to push rod 73.

Adjustment of the belt length to suit the convenience of the vehicle occupant is provided for by manual operation of push button 17 as shown in FIGURES 7 and 8. Push button 17 is manually moved to the limit of its travel as defined by stop surfaces 84 and 86. In this position, a front portion of cavity 82 moves L-shaped portion 88 of push rod 73, which is turn moves slide bar 63 and pawls 47, 48. It is to be noted that although push button 17 has been moved to the full extent of its stroke, push rod 73 has been moved to an intermediate position short of its full stroke. Pawls 47, 48 are thus moved to a first disengaged position in which tang 106 is clear of ratchet teeth 62, but not clear of latches 42 and 43. Push button 17 must be held in the adjusting position due to the bias of spring 57 acting on the pawls and slide bar 63. While the pawl control is held in the adjusting position, spool 37 is free to rotate in either direction for lengthening or shortening the belt as desired by the occupant. Lengthening or extension of the belt results in clockwise rotation of spool 37. As illustrated in FIGURE 7, clockwise rotation of spool 37 results in clockwise pivotal movement of latch 42 to a position in which stop shoulder 99 engages stop surface 108 preventing obstructing engagement of latch 42 with the pawl. Retraction or shortening of the belt results in counter-clockwise rotation of spool 37 as illustrated in FIGURE 8. Counter-clockwise rotation of spool 37 results in counter-clockwise pivotal movement of latch 43 to a position in which stop shoulder 97 engages stop surface 107 preventing obstructing engagement of latch 43 with the pawl. It is to be noted that rotation of spool 37 as described in connection with FIGURES 7 and 8 is permitted only so long as push button 17 is manually held against member 72. As soon as push button 17 is released, spring 57 restores the pawls to locking engagement with the ratchet wheels.

A further mode of operation is illustrated in FIGURES 9–9b in which the retractor is conditioned to permit free rotation in the retracting or counter-clockwise direction followed by free rotation in the extraction or clockwise direction before locking the spool. As shown in FIGURE 9, the belt clasp portion 18 is inserted in aperture 87 of push button 17. The clasp engages recessed L-shaped portion 88 of push rod 73 resulting in further movement of push rod 73 and slide bar 63. This additional movement of the push rod results in further movement of the pawls to a second disengaged position. In the second disengaged position, tang portion 106 of the pawls is moved outwardly beyond the obstructing portions of both latches 42 and 43. In this condition, spring motor 33 urges rotation of spool 37 in the counter-clockwise direction to retract belt 16. Counter-clockwise rotation of spool 37 pivots latch 43 in the counter-clockwise direction to a location in which the radially extended obstructing portion 96 prevents engagement of tang 106 with the ratchet teeth. Inasmuch as the pawls are held in the second disengaged position by latch 43, push rod 73 is isolated from the bias of spring 57. Push button 17 and push rod 73 thus become freely movable without affecting pawl engagement. It is believed evident from an inspection of FIGURE 9, that further rotation of the spool in the counter-clockwise or retraction direction will be permitted since latch 43 is maintained in pawl obstructing position by frictional engagement with the rotating spool and by engagement of projection 101 with the end of the longer curved slot 102.

Belt spool 37 may also be rotated freely in the clockwise direction permitting extraction of the belt to a body restraining position. Belt clasp 18 is removed from push button 17 and the belt is pulled out to the desired length. Extraction of the belt results in clockwise rotation of spool 37 and clockwise pivotal movement of both latches 42 and 43. As shown in FIGURE 9, the obstructing portions of latches 42 and 43 overlap each other, and the obstructing portion of latch 42 is of less radial extent than the obstructing portion of latch 43. While clockwise rotation of the spool moves latch 43 out of obstructing engagement with the pawls, latch 42 is simultaneously moved into obstructing engagement with the pawls such that continued rotation in the clockwise direction is permitted. After latch 42 reaches its rotational limit, latch 43 continues to rotate clockwise to its limit producing a gap between shoulders 97 and 99. As soon as the belt is released, spring motor 33 attempts to retract the belt, turning the spool in the counter-clockwise direction. Both latches rotate counter-clockwise with the spool bringing the gap under the pawl tang 106. Spring 57 then urges the pawls into engagement with the ratchet wheels.

A typical sequence of operations provided by the present retractor apparatus is illustrated as follows. The occupant removes belt clasp 18 from hook 17 and extracts sufficient belt to couple clasp 17 with buckle 23. Upon releasing the belt, the spool is first rotated in the retracting direction after which the pawls engage the ratchet wheels to lock the spool against further rotation in either direction. Adjustment of the belt length can be accomplished, at any time, by manually depressing push button 17, however, the spool is immediately relocked as soon as the push button is released. When the occupant is ready to leave the vehicle, clasp 18 is released from buckle 23 and inserted in aperture 87 of push button 17. This causes the spool to wind up the excess belt to a convenient storage position and also conditions the retractor to permit the beginning of another similar sequence of operations.

Although a preferred embodiment of the invention has been shown and described, it is to be understood that variations and modifications thereof are included within the spirit of the invention.

What we claim is:

1. A retractor assembly (15) for a safety belt (16) or the like, including a frame (26), a spool (37) rotatably mounted on said frame having ratchet teeth (62) secured thereto, drive means (33) operatively connected to said spool for yieldably urging rotation of said spool in one direction while permitting forced rotation of said spool in the other direction, and pawl means (47, 48, 49) movably mounted on said frame yieldably urged toward engagement with said ratchet teeth for preventing rotation of said spool, wherein the improvement comprises; means (65) for selectively moving said pawl means to either of first or second disengaged positions and latch means (42, 43) coupled with said spool for movement to an obstructing position preventing engagement of said pawl means with said ratchet teeth in response to rotation of said spool, when said pawl means is in said second disengaged position.

2. A retractor assembly according to claim 1, in which said latch means (42, 43) includes a stop element (97, 99) engageable with a portion of said pawl means (107, 108), effective to prevent movement of said latch to said obstructing position when said pawl means is in said first disengaged position.

3. A retractor assembly according to claim 1, in which said latch means (42, 43) is frictionally coupled with said spool, and pivotally mounted with respect to said frame for limited arcuate movement in response to rotation of said spool.

4. A retractor assembly according to claim 3, in which said latch means (42, 43) includes a pair of independently movable discs, each of said discs being mounted coaxially with said spool and frictionally coupled with respective end portions (38, 39) of said spool.

5. A retractor assembly according to claim 4, in which each of said discs (42, 43) includes a radially extended portion (96, 98) defining a shoulder (97, 99), said radially extended portions (96, 98) providing means for obstructing engagement of said pawl means with said ratchet teeth, said shoulders (97, 99) providing stop elements engageable with portions (107, 108) of said pawl means when said pawl means is in said first disengaged position, effective to prevent movement of said radially extended disc portions (96, 98) to said obstructing position.

6. A retractor assembly according to claim 4, in which one of said discs (43) is movable toward said obstructing position in response to rotation of said spool in said one direction, and the other of said discs (42) is movable toward said obstructing position in response to rotation of said spool in said other direction when said pawl means is in said second disengaged position.

7. A retractor assembly accordng to claim 6, in which one of said discs (43) includes a first radially extended obstructing portions (96) defining a shoulder (97), and the other of said discs (42) includes a second radially extended obstructing portion (98), said second obstructing portion being of less radial extent than said first obstructing portion, said first and second obstructing portions being effective to maintain said pawl means in said second disengaged position in response to the sequence of spool rotation in said one direction followed by spool rotation in said other direction, said shoulder of said first obstructing portion being effective to prevent movement of said one disc to said obstructing position in response to further rotation of said spool in said one direction.

8. A retractor assembly according to claim 1, in which said means for selectively moving said pawl means includes a movably mounted operator member (65) having an abutment (69) engageable with said pawl means, said operator member being manually movable for selectively positioning said pawl in either of said first or second disengaged positions.

9. A retractor assembly according to claim 1, in which said means for selectively moving said pawl means includes a movably mounted operator member (65) having an abutment (69) engageable with said pawl means, said operator member (65) including first (17) and second (73) control members manually movable relative to each other, manual movement of said first control (17) member being effective to move said pawl means to said first disengaged position, and manual movement of said second control member (73) being effective to move said pawl means to said second disengaged position.

10. A retractor assembly according to claim 9, in which said first control member (17) is connected to said second control member (73) by means of a lost motion connection, said first control member (17) having a limited range of movement for defining said first disengaged position of said pawl.

11. A retractor assembly according to claim 10, in which said first control member (17) includes an exposed operating surface (83) facilitating movement of said pawl means to said first disengaged position, and said second control member (73) includes a recessed operating surface (88) operable by means of an insertable element (18) for effecting movement of said pawl means to said second disengaged position.

12. A retractor assembly according to claim 11, in which said second control member (73) is partially enclosed within said first control member (17), said first control member (17) including an aperture (87) providing access to said recessed operating surface (88) of said second control member, arranged and disposed for receiving a portion (18) of a safety belt clasp.

13. A retractor assembly according to claim 1, in which said spool (37) is adapted for remote mounting in a motor vehicle above and behind an occupant seat, said means for selectively moving said pawl means including a compound operator member (17, 73) extending to a position closely adjacent said seat, said operator member including an exposed push button (17) effective upon actuation thereof to move said pawl means to said first disengaged position, said operator member also including a recessed push button (88) effective upon actuation thereof to move said pawl to said second disengaged position.

References Cited

UNITED STATES PATENTS

| | | | |
|---|---|---|---|
| 2,886,259 | 9/1956 | Barecki | 242—107.4 |
| 3,122,339 | 2/1964 | Whittingham | 242—107.4 |
| 3,412,952 | 11/1968 | Wohlert et al. | 242—107.4 |

STANLEY N. GILREATH, Primary Examiner

W. H. SCHROEDER, Assistant Examiner

U.S. Cl. X.R.

242—107.6; 280—150; 297—388